Jan. 6, 1959 C. H. HOEPPNER ET AL 2,867,720

COMMUNICATION RELIABILITY APPARATUS

Filed Oct. 26, 1945 4 Sheets-Sheet 1

Inventors
CONRAD H. HOEPPNER
CARL HARRISON SMITH, JR.

By Ralph L. Chappell
Attorney

COMMUNICATION RELIABILITY APPARATUS

Filed Oct. 26, 1945 4 Sheets-Sheet 2

Inventors
CONRAD H. HOEPPNER
CARL HARRISON SMITH, JR.
By Ralph Chappell
Attorney Jan. 6, 1959 C. H. HOEPPNER ET AL 2,867,720

COMMUNICATION RELIABILITY APPARATUS

Filed Oct. 26, 1945 4 Sheets-Sheet 3

INVENTORS
CONRAD H. HOEPPNER
CARL HARRISON SMITH JR.

BY D. B. Snyder
Edward White
ATTORNEYS

COMMUNICATION RELIABILITY APPARATUS

Filed Oct. 26, 1945

4 Sheets-Sheet 4

INVENTORS
CONRAD H. HOEPPNER
CARL HARRISON SMITH JR.

BY D. G. Snyder
Howard White
ATTORNEYS

1

2,867,720

COMMUNICATION RELIABILITY APPARATUS

Conrad H. Hoeppner, Washington, D. C., and Carl Harrison Smith, Jr., Arlington, Va.

Application October 26, 1945, Serial No. 624,914

5 Claims. (Cl. 250—6)

(Granted under Title 35, U. S. Code (1952), sec. 266)

This invention relates in general to the transmission of intelligence by radio and in particular to methods and apparatus for increasing the reliability of pulse communication systems.

In radio pulse communication, the element of secrecy may be introduced by the employment of pulses of such short duration that the transmission of even an extended message may involve less than a second of transmitter emission time. For example, each individual pulse may have a duration of five microseconds and an average of five pulses may be required to convey each element of intelligence. If twenty thousand elements of intelligence (such as letters of the alphabet) are dispatched, the number of pulses involved is 100,000 which is equivalent to 500,000 micro-seconds or one-half second of transmitter emission time. The total elapsed time may amount to several minutes but the percentage of that elapsed time actually employed is very small. Obviously a non-recurrent transmission of this nature is difficult to monitor except by means substantially identical with those designed specifically to receive the message. The small interval of time utilized in combination with the requirement that the frequency must be known renders even detection of the fact that a message is being transmitted quite difficult. Equally obvious is the fact that if, in order to make certain that the message reaches the receiver ungarbled by interference or fading, the elements of the message must be repeated a number of times the element of secrecy is reduced considerably.

Electrical impulses employed to convey intelligence may be endowed with certain characteristics of duration, amplitude, spacing, or rate of change of amplitude and the receiver provided with apparatus singly responsive to impulses so endowed. This procedure limits to an insignificant amount the garbling of a message through the direct reception of random noise or a conflicting transmission. It does not, however, prevent garbling of a message caused by the loss of message pulse elements the characteristics of which are so altered by interfering noise or conflicting transmission as to cause the pulse elements to be rejected by the apparatus provided to reject interference. Nor does it prevent garbling of the message caused by atmospheric conditions which may so weaken portions of a group of pulses as to prevent their reception.

These troubles may be largely overcome by repeating the message elements a number of times until there is an indication or a reasonable certainty that the message has been received in proper form. As has been said, multiple repetition of the message elements robs the communication of its secrecy and simplifies the monitoring problem.

It is an object of this invention to provide method and means for increasing the reliability of communication.

It is another object of this invention to provide method and means for overcoming random noise and conflicting transmission interference with a minimum reduction in secrecy in radio pulse communication.

It is another object of this invention to provide method and means whereby repetition of a message results in a maximum of reliability with a minimum loss of secrecy.

Other objects and features of this invention will become apparent upon a careful consideration of the following detailed description when taken together with the accompanying drawings in which.

Figure 1:
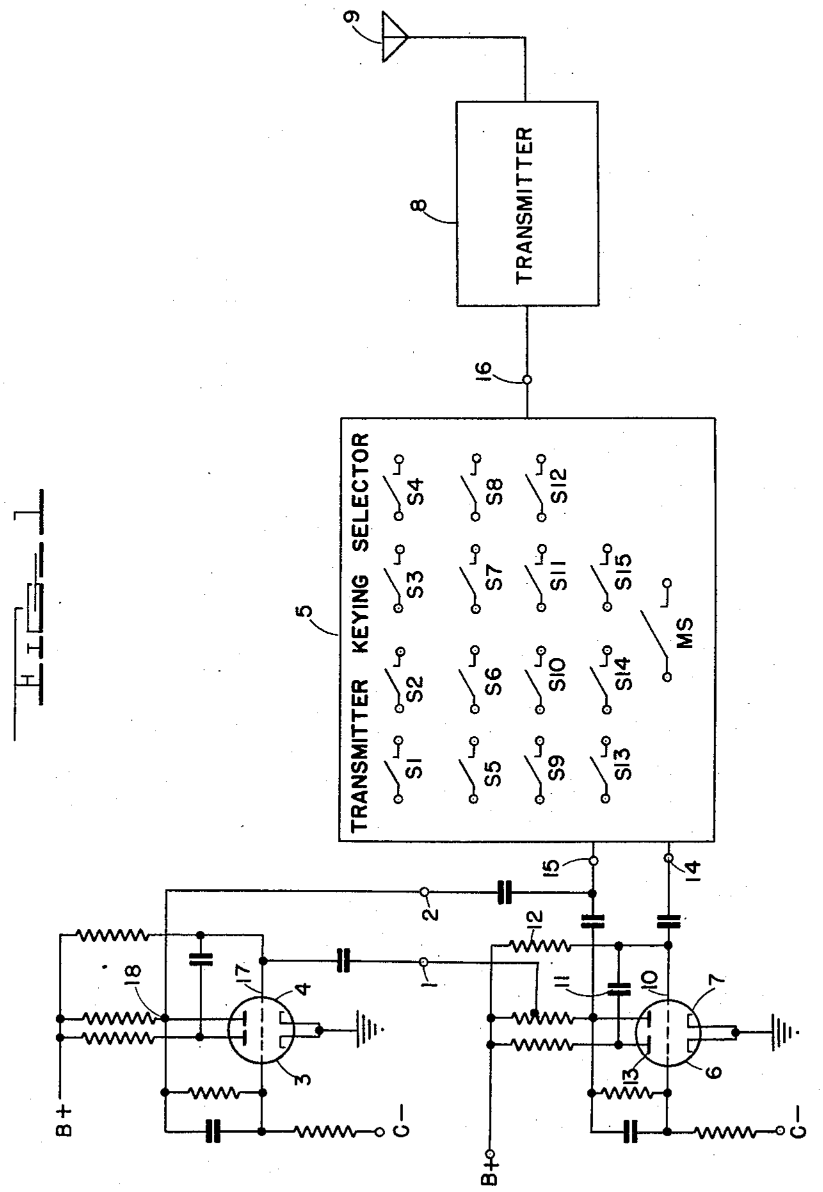
Fig. 1 is a circuit diagram, partly in circuit form and partly in block form useful in explaining the operation of this invention.

The principle upon which this invention is based is that, if a portion of a message being communicated be lost through interference while the remaining portion be received and registered, and the message be repeated, a portion thereof being lost through interference while the remaining portion be registered without striking from registration the previous portion, the registered portions will be supplementary since the interference, which is random with respect to the various portions of the message, will not operate to cause the loss of identical portions of both registrations.

For example, if a group of pulses conveys a certain message and one or more of the pulses in the group is so affected by interference as to hinder its reception and so as to thereby garble the message, the portion received may be salvaged and registered. If the group of pulses is again dispatched, it is improbable that interference will affect the same constituent pulses as before and the pulses salvaged from the two groups may supplement each other and complete the message. The pulse group, if necessary, may be dispatched a third or a fourth time. Even so, a complete message may be secured whereas it may be necessary to repeat the message many more times before it comes through ungarbled in a single transmission.

A pulse communication system has been disclosed by Krause and Cleeton in copending application Serial No. 593,174 filed May 11, 1945, which may be employed as a vehicle to illustrate one embodiment of this invention. In that system, a group of two or more electrical impulses is transmitted over a given time interval. The desired message is conveyed by the arrangement of the electrical impulses comprising the group with respect to the start of the interval of group transmission. The group structure, that is, the disposition of impulses in the group, may be altered according to the information it is desired to send. A timing device is employed at the transmitting source to provide a time pattern from which the group structure to be transmitted is formed and another timing device is employed at the receiving end to provide a pattern into which the received group is fitted for translation into intelligence. The transmitter timing device and the receiver timing equipment are cooperative in their actions in that the operation of the latter is initiated in a definite time relation to the initiation of the operation of the former and the two generate time bases, the unit intervals of which bear substantially constant and definite relationship to each other.

One form of the system disclosed in copending application supra employed at the receiving end a total of fifteen trigger controlled mechanical relays each one responsive to a different pulse of a sixteen pulse group (none responsive to the initial pulse). The mechanical relays provided therein were each part of a separate electronic switch circuit having two stable states. The electronic switch circuits each had two points of input, both for receiving negative impulses. A negative impulse at one of the input points served to trigger the electronic switch into the stable state corresponding to energization of the associated mechanical relay. Such a negative pulse would be impressed on the switch only if the pulse to which the relay corresponded were included in the pulse group received. Thus, the closing of that particular relay would register the presence of that particular pulse in the group. A negative impulse at the other of the input points served to trigger the electronic switch into the other stable state corresponding to the de-energization of the associated mechanical relay. Such a de-energizing negative pulse was derived from a vacuum tube which may be termed a striking tube since its function was to open the relay and thus strike the registration of a previously received pulse. This striking tube was arranged to function in response to the initial pulse of a received group and thus strike a previously received group from the register and prepare for the registration of any of the possible fifteen remaining pulses of the group to which it belonged. It will be understood that a second negative pulse following on the heels of a first negative pulse at the same point of input of the electronic switch had no effect on the switch unless an intervening pulse had been applied to the other point of input. It will be further understood that the action of the mechanical relay was slow as compared to the speed with which the electronic switch could change states. Thus a pulse arriving at one point of input could call into being one state and a pulse at the other input soon thereafter could cause the switch to revert to its original state without effecting the mechanical operation of the relay.

The initial pulse of each group, in addition to causing the striking tube to strike the registration of a previous group also had the function of initiating the operation of an oscillator controlled timing device which provided the fifteen separate time intervals during which a different one of the fifteen relays could be closed by the reception of a pulse. In the operation of the system, the initial pulse of each group struck from registration each previous pulse group and repetition of the same group resulted in an ungarbled message only if one or more complete versions of the group were received.

For a better understanding of the foregoing, reference is now had to Fig. 1 which illustrates, partly in circuit form and partly in block diagram, a pulse communication transmitter. Were the connections to be opened at terminals 1 and 2 between the two vacuum tube circuits so as to segregate vacuum tube elements 3 and 4 and their immediately associated circuit elements, the remaining components would represent transmitting equipment as described in copending application supra. Block 5, in combination with tube elements 6 and 7 and their immediately associated circuit components comprise a transmitter keying selector, block 8 represents a transmitter keyed by selector 5, and antenna 9 is designed to emit the pulses generated by transmitter 8. Tubes 6 and 7 comprise the vacuum tube elements of a conventional one-shot (delay type) multivibrator which has only one stable state of equilibrium (7 conducting and 6 non-conducting) but which will maintain, upon receipt of a negative signal at grid 10 of tube 7, a second state (6 conducting and 7 non-conducting) for a definite interval of time which may be used for delay purposes as hereinafter described. The time interval for which the second state of the multivibrator can be maintained is determined substantially by the time constant circuit formed by condenser 11 and resistance 12. As tubes 6 and 7 are driven into conduction and non-conduction respectively to produce the delay period state of the multivibrator, plate 13 of tube 6 is thereby driven sharply negative and condenser 11, which is fully charged, holds grid 10 of tube 7 below cutoff until it partially discharges through resistance 12.

In operation, the pulse group structure to be transmitted is determined by which of the switches S1 through S15 are closed. The closing of master switch MS initiates the transmission and causes a negative pulse to be applied to the delay multivibrator via terminal 14. The delay multivibrator proceeds through its delay (of the order of .01 second) at the end of which time tube 7 is again driven conducting to apply a negative signal to block 5 at terminal 15 to start the formation of the keying pulse group. This delay is introduced between the closing of MS and the actual start of the keying pulse group so as to avoid key bounce and circuit inductance difficulties. When MS is closed, and after the described delay, an initial keying pulse appears at terminal 16 of block 5 regardless of whether any of the switches S1 through S15 have been closed. If, however, any of the S series switches have been closed, corresponding pulses will appear at terminal 16 following the initial pulse and spaced in time therefrom according to the number of the switch closed. If, for example, a pulse duration of ten micro-seconds and a spacing, pulse to pulse of ninety micro-seconds be employed, the closing of all 15 of the S series switches and switch MS would result in the appearance at terminal 16 of an initial pulse and fifteen remaining pulses each spaced from the other ninety microseconds. If only switches S3, S10, and S14 (and switch MS) are closed, there appears at terminal 16 the initial or zero pulse, the number 3 pulse spaced therefrom by 290 microseconds, the number 10 pulse spaced from the initial pulse by 990 microseconds and the number 14 pulse spaced from the initial pulse by 1390 microseconds. Transmitter 8 emits via antenna 9 a pulse group having the same structure as appears at terminal 16.

Figure 2:
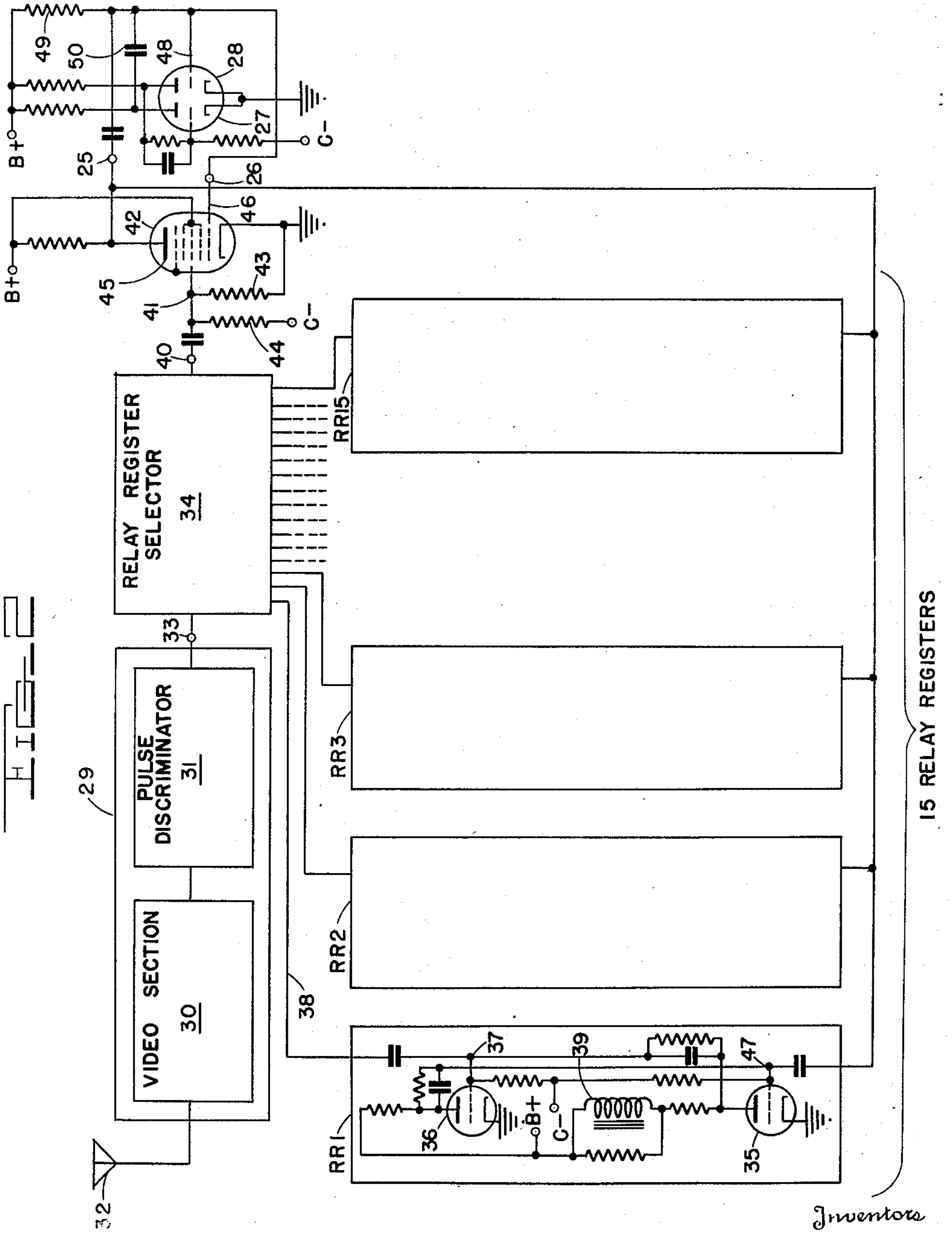
Fig. 2 is a similar circuit diagram also useful in explaining the operation of this invention.
Figure 3:
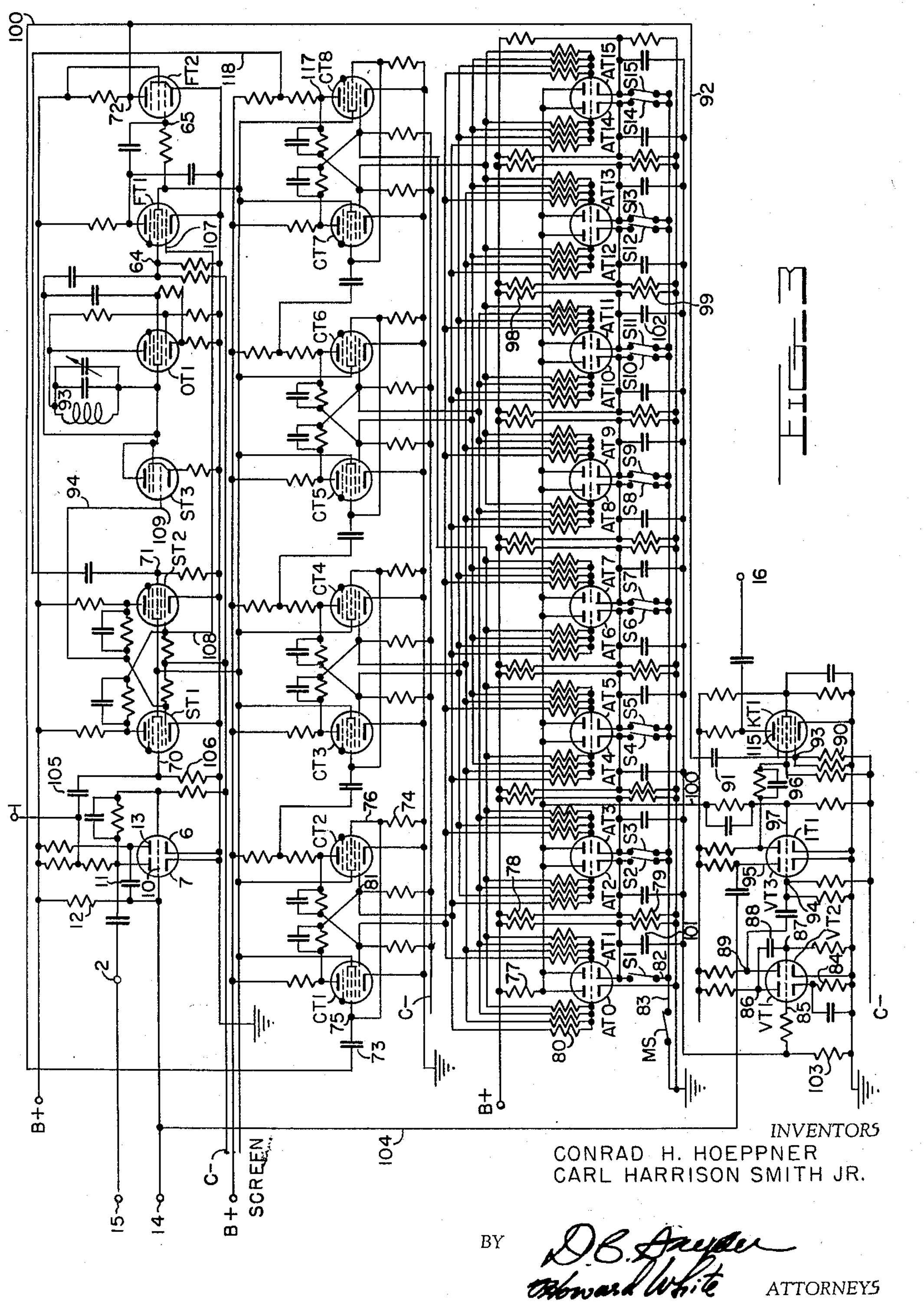
Figs. 3 and 4 show in schematic diagram form the Transmitter Keying Selector 5 and the Relay Register Selector 34 respectively of Figs. 1 and 2.

The above described action of the Transmitter Keying Selector 5 may be more fully comprehended from a reference to Fig. 3 which is a duplicate of the Selector Keyer shown in Fig. 2 of the above-identified copending application. Starting at the upper left hand corner of Fig. 3, tubes 6 and 7 represent the vacuum tube components of the conventional delay multivibrator described above and which has only one stable state of equilibrium (tube 7 conducting and tube 6 non-conducting) but which will maintain, upon receipt of a negative signal at grid 10 of tube 7, a second state (tube 6 conducting and tube 7 non-conducting) for a definite interval of time as described above. ST1 and ST2 represent the vacuum tube components of a conventional scale-of-two counter or electronic switch which has two stable states of equilibrium (ST1 conducting and ST2 non-conducting or vice versa) either of which may exist according to the signals impressed upon the second control grids 70 and 71 of ST1 and ST2. ST3 represents a single vacuum tube employed as a switch, the control grid of which is connected to the grid of ST1 through lead 94 so as to conduct current for one state of equilibrium (ST1 conducting and ST2 non-conducting) and to become non-conducting in response to the other state of equilibrium (ST2 conducting and ST1 non-conducting). OT1 represents the vacuum tube component of a "negative transconductance" or "transitron" oscillator whose tank circuit 93 is serially disposed in the plate of ST3. When ST3 is conducting, its plate current will hold OT1 quiescent, but when ST3 becomes non-conducting OT1 generates, for example, a ten kilo-cycle sine wave which always starts at zero phase, proceeds in a positive direction on the initial excursion and reaches maximum amplitude on the first half cycle of the sine wave. FT1 and FT2 represent the vacuum tube components of a two stage squaring amplifier which is connected to the output of OT1 and functions to amplify and square up the sine wave output from OT1 so that the signal on plate 72 of FT2 is a series of substantially rectangular positive pulses of time duration and spacing both equal to a half period of OT1 oscillator frequency. The mode of operation of tubes 6, 7, ST1, ST2, ST3, FT1 and FT2 by means of which a stable train of positive pulses is thus generated is described in co-pending application Serial Number 595,222, entitled "Controllable Pulse Generator" by Harold Lyons, filed May 22, 1945, now U. S. Patent No. 2,475,625.

FT1 has its second control grid 64, to which the sine wave output of the oscillator OT1 is applied, returned to a source of C− voltage so that it will only pass and amplify the positive half cycles of the sine wave input. There will thus appear on the plate of FT1 a series of clipped negative half cycles of sine wave voltage which is applied to control grid 65 of FT2. The control grid of this tube is returned to a positive source of potential which is arranged so that the negative half cycles of input will drive FT2 below cut-off to thereby produce at plate 72 of the latter a series of rectangular positive voltage pulses having the above described characteristics. CT1 and CT2 represent the vacuum tube components of a scale-of-two counter stage, of a four stage, scale-of-sixteen electronic counter. Likewise CT3 and CT4, CT5 and CT6, and CT7 and CT8 represent the second, third and fourth stages respectively of the electronic counter. The positive pulse output of squaring amplifier stages FT1 and FT2 is impressed upon the electronic counter through lead 100 and a low time constant circuit comprising capacitor 73 and resistor 74 in such a manner that the pulses are differentiated thereby forming and applying to the second control grids 75 and 76 of CT1 and CT2 alternate positive and negative peaked signals corresponding respectively to the leading and trailing edge of said positive pulse output.

The counter circuit, as shown, is made up of multiple grid tubes and by its design, responds only to the negative peaked signals applied to the second control grids so that the electronic counter circuit acts to count the trailing edges of the output pulses from squaring amplifier FT1 and FT2. AT0 through AT15 comprise the vacuum tube components of a series of triode type pulse keying channels. In all of these channels the plate of the triode is connected to a common load resistance 77 (shown at the plate of the AT0 tube), while the cathode of each triode, except AT0, is provided with its own bias supplied by separate voltage dividing resistances, typified in the AT2 channel by resistances 78 and 79 and their connection between B+ and ground. Also the grid of each of the triodes is connected through a separate resistance to one of the grid circuits in each of the four counter stages. The latter connection is typified in the AT0 channel by the connection of the grid resistance 80 to the grid circuit 81 of the first counter stage. These interconnections are so made that a different one of the AT tube series is driven conducting by the counter circuit during each of the total of sixteen states which can exist in the scale-of-sixteen counter. In this particular instance the operation of the counter CT1 to CT8 operates to consecutively remove the bias from the grids of the AT series tubes as the counter circuit is driven through a complete cycle of operation. Further, the inter-connection of the grids of the AT tubes to the counter is so made that amplifier AT0 only is conducting in the quiescent or zero state of the counter, which is prior to the dispatch of a transmission. After the circuit is set into operation and the counter starts to change states, AT1 becomes the only AT tube capable of conducting after the arrival of the first negative peaked signal at the counter input, AT2 becomes the only AT tube capable of conducting after the second negative signal to the counter and so down the series of AT tubes until AT0 again becomes the only conducting tube after the sixteenth negative signal to the counter. Switches S1 through S15 represent on-off toggle type switches in the cathode leads of the AT1 through AT15 amplifier tubes, typified by cathode lead 82 of AT1, and correspond to the pulse control switches mentioned heretofore. As can be seen, the S switch in the cathode lead of a given AT tube must be closed before that tube can conduct and amplify when it is unbiased by the counter. Switch MS represents an on-off switch which, when open (off position), isolates common cathode lead 83 of all the AT series except AT0 from ground. When closed (on position), MS permits conduction insofar as common cathode lead 83 is concerned. VT1 represents a cathode biased amplifier employing grid circuit clipping. The quiescent condition, which VT1 assumes by virtue of the flow of plate current through cathode biasing resistor 84 provides for the amplification by VT1 of input signals to its grid 85 which are either positive or negative with respect to ground. VT2 represents an unbiased amplifier upon the grid of which are impressed the signals appearing at plate 86 of VT1 which may be either positive or negative. A positive signal at grid 87 of VT2 causes grid current flow and charging of capacitor 88 in such a fashion that, upon decay of the positive signal when grid current can no longer flow, grid 87 is driven below ground potential and a positive signal appears at plate 89 of VT2. A negative signal at grid 87 of VT2 also causes a positive signal at plate 89 so that a positive signal thus appears at plate 89 of VT2 regardless of the polarity of the signal applied to VT1. This positive signal from the plate 89 of VT2 is impressed on the grid 94 of amplifier stage VT3 and causes a strong negative signal to appear at its plate 95.

KT1 is essentially a keying tube for keying the transmitter 8 from the output of the squaring amplifier FT2 under control of IT1 which in turn is driven by the AT series tubes. The output from FT2 is applied to the first control grid 93 of KT1 through lead 92 and a low time constant coupling circuit consisting of capacitor 91 and resistance 90, which converts the positive pulse output from FT2 into alternate positive and negative peaked signals corresponding respectively to the leading and trailing edges of the positive pulses appearing on the plate of FT2. Control grid 93 is returned to a source of C− potential so that KT1 will only amplify and pass the positive peak inputs, and these only when the second control grid 96 of KT1 is unbiased by IT1. The grid of the latter is returned both to the common plate resistance 77 of the AT series tubes and to a source of C− potential. Thus each time one of the tubes in the AT series becomes conducting a negative pulse is applied to grid 97 of the IT1 tube thereby causing its plate to rise positively to unbias the second control grid 96 of tube KT1. The mode of operation of the AT series, IT1 and KT1 is described in co-pending application Serial Number 599,287, entitled, "State Selector," by Carl H. Smith, Jr., and Milton L. Kuder, filed June 13, 1945, now U. S. Patent No. 2,409,229.

Let it be assumed that the operator wishes to institute a pulse transmission including the second and the eleventh pulses corresponding to switches S2 and S11, hence these switches are closed. This raises common cathode lead 83 with switch MS open, to the potential above ground existing at the juncture of resistors 78 and 79, to which the cathode of AT2 is connected. This same positive potential exists at the juncture of resistors 98 and 99 to which the cathode of AT11 is connected and at like points associated with all AT series tubes except AT0. The operator then closes switch MS, grounding common cathode lead 83. AT2 and AT11 cannot conduct however, at the instant of closing MS, since the grid bias provided to all the AT tubes by the counter when the latter is in a zero state holds all of the AT series non-conducting except for AT0 only, which is conducting as hereinbefore described. Conduction by AT0 causes a negative voltage to be developed across the common AT plate resistor 77 which voltage is impressed upon the control grid of IT1 through lead 100, thereby rendering that tube non-conducting and unbiasing second control grid 96 of KT1. The grounding of common cathode lead 83 by the closing of MS discharges the cathode condensers, typified by condensers 101 and 102 connected to the cathodes of AT2 and AT11, through the grid resistor 103 of VT1, to cause a negative signal to be applied to grid 85 of VT1. As previously described, a negative signal impressed upon VT1 causes a negative signal to appear at plate 95 of VT3. This negative signal on plate 95 is communicated through lead 104 to multivibrator 7 and 6 which is in its normal quiescent equilibrium state with 7 conducting and 6 non-conducting. The multivibrator is thus triggered, 7 becomes non-conducting and 6 conducting, and the delay period starts. The positive signal obtained from the plate of 7 as the multivibrator is triggered is communicated to ST1 through a low time constant circuit condenser 105 and resistor 106, to find ST1 in its quiescent state, which is conducting, and therefore has no effect on electronic switch ST1 and ST2. During the delay period, which is in the order of .01 of a second, transient signals which appear at the grid of 7 folowing the negative triggering signal and which comprise the effect of possible failure of MS to achieve full and instantaneous contact and the effect of wiring inductance, are rendered impotent by virtue of the fact that 7 is biased strongly below cutoff. These transient signals die out during the delay period and thus do not effect the subsequent circuit operation.

The delay period progresses to its end and multivibrator 7 and 6 reverts to its normal state dropping the plate voltage on 7 and thereby impressing a negative signal on ST1 as it does so. This negative signal causes ST1 and ST2 to switch states, rendering ST1 non-conducting and ST2 conducting which has the dual effect of impressing a positive unbiasing potential on first control grid 107 of FT1 through lead 108 and impressing a negative biasing potential on control grid 109 of ST3 through lead 94. Since ST3 can no longer conduct, the the current it normally draws through the oscillator tank circuit 93 is abruptly terminated and the transitron oscillator OT1 is rendered operable whereupon a sine wave voltage obtained from the plate side of ST3 is impressed on squaring amplifier stage FT1 and FT2 with the resulting rectangular positive pulse output hereinbefore described.

The positive going leading edge of the initial or zero positive pulse from FT2 is impotent with respect to the counter since the latter is held solely responsive to negative pulses and leaves it in its zero state which comprises CT2, CT4, CT6, and CT8 conducting. As above-mentioned, this counter zero state establishes the zero state in the AT series which consists of AT0 only capable of conducting. The positive pulse output from FT1 and FT2 is also communicated to first control grid 93 of KT1 through lead 92 and the low time constant circuit consisting of capacitance 91 and resistor 90 and causes a negative signal to appear at plate 115 of KT1 and be applied to the transmitter (not shown) so that it is keyed and a pulse transmitted, which can be designated as the initial or zero pulse. It will be apparent that this zero pulse will always be transmitted on each pulse group transmission since AT0 is always capable of conducting in the zero state of the counter and has no switch in its cathode to interfere with such conduction.

The negative going trailing edge of the initial or zero positive pulse from FT2 is impotent with respect to KT1 since its first control grid 93 is always biased off in the absence of a positive signal.

This trailing edge impressed on the counter through lead 100, however, supplies the necessary negative signal to institute the counter function and CT1 therefore becomes conducting and CT2 non-conducting. The coincident signal communicated from the plate of CT2 in the first stage to the second control grids of the second stage of the counter is positive and the second stage and remainder of the counter tubes are therefore unaffected. Thus is established the number one state of the counter which in turn establishes the number one state in the AT series which consists of rendering only AT1 capable of conducting insofar as its grid bias alone is concerned. Switch S1 in the cathode lead of AT1 was not one of those closed by the operator, however, and AT1 cathode is held so high above the grid by its cathode bias that no plate current flows. This means that none of the AT series can conduct and a positive voltage pulse is developed across the common plate resistor 77 of the AT series and is applied to grid 97 of IT1 rendering it capable of conduction. The resulting drop in the plate potential of IT1 biases off second control grid 96 of KT1 and thereby renders impotent the leading edge of the next positive pulse (designated number one pulse) from FT2 which would otherwise have keyed the transmitter. Thus is suppressed from the available pulse group pattern the number one pulse by virtue of the fact that the operator did not choose to close S1. By the same token, the number two pulse is transmitted since S2 was closed, the number three pulse through number ten pulse are suppressed, the number eleven pulse is transmitted, and the number twelve through number fifteen are suppressed.

The trailing edge of the sixteenth positive pulse from FT1 and FT2 which concluded the period during which AT15 could have conducted insofar as its grid was concerned, returns the counter to its zero state by rendering CT2, CT4, CT6 and CT8 conducting. This means that a negative signal appears at plate 117 of CT8 which is applied through lead 118 to the second control grid 71 of ST2 causing the electronic switch ST1 and ST2 to return to its zero state. The dual functions of ST1 and ST2 now proceed in the direction such as to unbias ST3 and thereby stop the transitron oscillator OT1 and bias FT1 so as to block the passage of any transient oscillations which follow the termination of controlled operation of OT1. The transmission of the pulse group has been accomplished and the transmitter keying selector is left in the zero state. The transmission cannot repeat itself automatically since a negative signal caused by grounding the cathodes of one or more of the AT series tubes is necessary to start the sequence of operations just described. The pulse group transmission cycle is now complete.

Returning to Fig. 1, tubes 3 and 4 represent the vacuum tube elements of a delay multivibrator similar to the one which comprises tubes 6 and 7. Its operation is identical so that a negative signal applied to grid 17 of tube 4 results in the appearance at anode 18 of that tube of a negative signal at the end of the multivibrator delay period. The negative signal which is applied to grid 17 reaches it from the anode circuit of tube 7 simultaneously with the starting of the keying pulse group by block 5. The negative signal which subsequently appears at anode 18 of tube 4 is applied to block 5 via terminals 2 and 15. Thus, the multivibrator comprising tubes 3 and 4 results in the starting of a second pulse group identical with the pulse group started by the first multivibrator and spaced in time by a selectable delay interval. The transmission via antenna 9 then consists of two identical pulse groups each conveying the same message and both occurring within a predetermined interval. The individual pulses of these two groups are of a predetermined duration, there being, as is described hereafter, apparatus at the receiver singly responsive to electrical impulses of the predetermined duration. This arrangement reduces the falsification of communication through interference and conflicting transmissions.

Fig. 2, to which reference is now had, illustrates, partly in circuit form and partly in block diagram, a pulse communication receiver. Were the connections to be opened at terminals 25 and 26 (in the upper right hand section of the figure) so as to segregate vacuum tube elements 27 and 28 and their immediately associated circuit elements, the remaining components would represent receiving equipment as described in copending application supra. Block 29 represents the receiver proper and comprises high frequency and video section 30 and pulse width discriminator section 31. Electrical impulses, including a desired message, atmospheric disturbances, and conflicting transmissions, arriving via antenna 32 are amplified and detected and pass, in the form of the video envelope of the incoming impulses to pulse width discriminator 31. Discriminator 31, which may be of the type described in our copending application Serial Number 621,401, entitled Pulse Width Discriminator, filed October 9, 1945, now Patent No. 2,634,346, passes only those video pulses of the width predetermined by the transmitter equipment of Fig. 1. Only electrical impulses of the proper duration reaching antenna 32 cause a signal pulse to appear at output terminal of receiver 29. Thus it may be said that receiver 29 rejects impulses of other than the specified width and receives only those of correct width. If, for example, the transmitter of Fig. 1 emits an electrical impulse which is subjected by reflections or atomospheric disturbance to "pulse-stretching" so as to change its width, receiver 29 will reject rather than receive that particular impulse.

Figure 4:
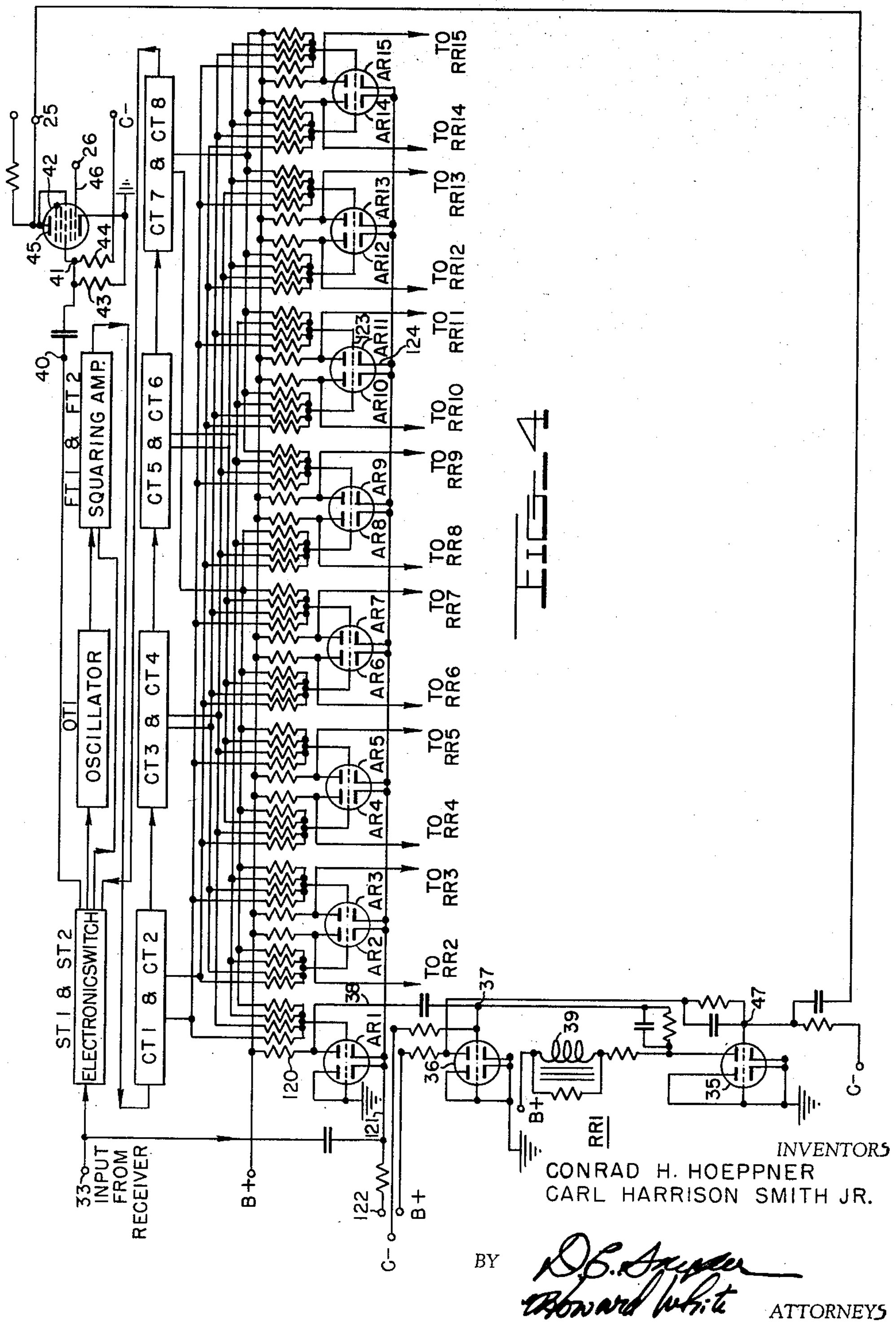

Of a pulse group appearing at output terminal 33 and applied to relay selector 34, the initial pulse starts into operation the timing device in the relay selector shown in greater detail in Fig. 4 which determines the particular one of 15 relay registers which is capable of registering a signal pulse if one arrives during a particular interval of the pulse group transmission. For example, if the transmitter equipment of Fig. 1 emitted a pulse group comprising the initial (or zero) pulse, the number 1 pulse, the number 10 pulse, and the number 14 pulse, and these pulses arrived unscathed, relay selector 34 will allow the number 1 pulse to reach relay register RR1, the number 10 pulse to reach RR10 and the number 14 pulse to reach RR14. The remaining relay registers will receive none of these signals inasmuch as they correspond to time intervals during which no pulses were inserted at the transmitting source.

Referring now in particular to Fig. 4, the details of the receiver selector 34 and one of the relay registers RR1 is shown in greater detail. The electronic switch ST1 and ST2, oscillator OT1, squaring amplifier FT1 and FT2, and counter stages CT1 and CT2, CT3 and CT4, CT5 and CT6, and CT7 and CT8 of the receiver control selector are shown in block diagram form inasmuch as they perform essentially the same duties as the like components perform in the transmitter keying selector of Fig. 3. Oscillator OT1, when keyed, operates at the same frequency as OT1 in the transmission equipment. Tube 42 shown in the upper right hand corner of the figure together with the circuit components with which it is immediately associated represent a voltage amplifier which is biased to cutoff potential or slightly below by the connection of grid 41 to ground through resistance 43 and to C— potential through resistance 44. This bias provides than only positive signals applied to grid 41 will be amplified and inverted at plate 45. Negative signals applied to grid 41 only increase the magnitude of the bias. AR1 through AR15 comprise the vacuum tube components of a series of pulse amplifying channels similar to the AT series in the transmitter keying selector except that there is no AR0 component and each AR tube has an individual plate load resistor, typified by resistance 120 in the plate circuit of AR1, for providing individual signals to the corresponding tubes of the RR series. The AR series has the respective grid potentials controlled by the sixteen states of the counter as in the transmission equipment. Each RR tube represents essentially one half of an electronic switch, the other half of which comprises the corresponding numbered RR series tube to which it is connected. Each RR tube has a current energized relay coil in its plate circuit typified by coil 39 in the plate circuit of 35, such relays being used to register the pulse transmission instituted by the transmitter.

Let it be assumed that the pulse group formed by the closing of S1 and S11 in the transmission equipment is received by receiver 29 of Fig. 2, amplified, detected, and fed, in the form of a pulse group of three negative pulses, to input 33 of the receiver control selector of Fig. 4. Pulse zero trips electronic switch ST1 and ST2. The succeeding two pulses, number one and number eleven will not affect the electronic switch since they are also negative and arrive to find the tube to which they are applied in a non-conducting condition. Electronic switch ST1 and ST2, which has been tripped by the zero pulse, starts oscillator OT1, unbiases squaring amplifier FT1 and FT2 and applies, from what corresponds to the plate of ST1 in switch ST1 and ST2, a positive signal through terminal 40 to control grid 41 of clearout tube 42. A negative signal thus appears at plate 45 of tube 42 and is applied to terminal 25 and hence in parallel to the grids of the entire series of relay tubes, RR1 through RR15, typified by grid 47 of RR1, thereby switching any of the RR tubes which might be conducting from a previous transmission over into a non-conducting state. The negative signal from plate 45 of tube 42 will have no effect on the RR series tubes which are in a non-conducting condition since they will be biased below cutoff. The aforementioned zero pulse will also have been applied to common cathode lead 121 of the AR series tubes so as to overcome, during the duration of the pulse, the fixed positive bias applied at 122. This cathode bias removal will be rendered impotent, however, by the fact that the zero state of the AR series is such that their grid biases are all held by the counter circuit at a value which will not permit conduction even when the cathode bias is removed. It may be noted here that an AR0 stage, if one were employed, would logically have been rendered conducting by the zero pulse. The counter, having begun to feed on the output of squaring amplifier FT1 and FT2, places the AR series in its number one condition which comprises AR1 capable of conducting insofar as its grid bias is concerned. The first pulse in the received pulse group, which was designated the number one pulse, arrives at input 33 to the receiver control selector coincident with the second positive oscillation of oscillator OT1 at a time when the AR series is in its number one state. This means that AR1 is prepared to conduct by the counter circuit insofar as grid bias is concerned. The number one received pulse removes the cathode bias from the AR series and AR1 conducts. This conduction by AR1 places, through lead 38, a negative signal on grid 37 of tube 36, which is in its normally conducting state, and stops conduction. The positive potential from the plate of tube 36 is applied to grid 47 of tube 35 to render it conducting in the normal manner of an electronic switch. Conduction by 35 energizes relay coil 39 in its plate circuit and the function for which number one pulse was intended is instituted. Between the time the number one pulse is applied to input 33 and the number eleven pulse (as hereinbefore designated) is applied, squaring amplifier FT1 and FT2 continues to feed the counter which in turn removes the grid bias successively from AR3 down the series through AR11. During the interval in which AR11 has its grid 123 unbiased, number eleven pulse arrives, unbiases cathode 124 and the relay in the plate circuit of RR11 is closed in the same manner as relay 39 in the plate circuit of RR1. No more pulses exist in this group and oscillator OT1 continues its sine wave production until the counter is returned to its zero state. This return of the counter to its zero state sends a signal to electronic switch ST1 and ST2 which stops oscillator OT1, biases off squaring amplifier FT1 and FT2, and sends a negative signal to grid 41 of clear-out tube 42 which, as hereinbefore described, is unresponsive to negative signals. The return of the counter to its zero state also places the AR series in its zero state so that all AR tubes are biased off with respect to their grids. The entire receiver control selector has been placed in its zero state, and is ready for the arrival of another pulse group. The net result of the group just received has been to close, and leave closed, the relays in the register circuits of RR1 and RR11. This was the original intention of the operator of the transmitter equipment in closing switches S1 and S11 of Fig. 3. Thus it can be seen that the structure of the received pulse group has been fiitted into a pattern by the receiver control selector, analyzed, and employed to actuate the controls desired by the operator.

Referring again to Fig. 2, it will be seen that according to the teachings of this invention, each pulse group is transmitted twice within a predetermined interval of time as hereinbefore described. The initial pulse of the first of the two groups strikes from registration any preceding message held by RR1 through RR15. The remaining pulses of that first group which are received and appear at terminal 33 are registered by RR1 through RR15. A delay multivibrator comprising vacuum tube elements 27 and 28 has been provided to prevent the initial pulse of the second pulse group from striking from registration the pulses registered from the first pulse group. This delay multivibrator is identical in operation (although not necessarily so) to the two delay multivibrators described in connection with Fig. 1. When its stable state exists, tube 28 conducts (grid 48 at approximately ground potential). During the delay period which is initiated by a negative signal at grid 48, tube 28 is nonconducting and grid 48 is held at below cutoff potential for the period of delay. This period of delay has a duration determined substantially by the time-constant circuit comprising resistor 49 and capacitor 50 and has been chosen so as to be equal to or slightly greater than the predetermined interval of time required by the transmitter equipment of Fig. 1 to dispatch the two identical pulse groups.

With the connections made at terminals 25 and 26, the stable state of the multivibrator holds grid 48 at substantially ground potential and grid 46 of striking tube 42 is thereby held at a potential which permits striking tube 42 to conduct insofar as grid 46 alone is concerned. Thus, the initial pulse of the first of two pulse group strikes, by means of striking tube 42, any pulses registered from a previous transmission. The initial pulse, again by means of striking tube 42, also triggers the multivibrator into its delay period during which grid 48 of tube 28 and grid 46 of tube 42 are held below cutoff potential. The initial pulse of the second group arrives during this delay period and finds striking tube 42 held unresponsive by grid 46. Thus the relay registers RR1 through RR15 retain such of those pulses of the first group as were received and proceed to register all those pulses of the second group corresponding to pulses present in the first group as transmitted but not as received.

Although only two pulse groups were transmitted for each element of a message and this represents a desirable procedure from the standpoint of security, it will be apparent that means may be provided at the transmitter to dispatch each pulse group any desired number of times, the delay period of the multivibrator or other delay means at the receiver being increased accordingly. There also arises the question of message falsification through loss of the initial pulse of a pulse group in which case a subsequent pulse in the group might constitute the initial pulse received. This difficulty may be overcome by one or more means one of which is described in our copending application, Serial Number 621,400, entitled Pulse Group Discriminator, filed October 9, 1945, now Patent No. 2,545,464. When employing the means last mentioned, the true initial pulse may be endowed with a duration different than subsequent pulses in the group and thus prevent such subsequent pulses from acting as an initial pulse.

Since certain further changes may be made in the foregoing constructions and different embodiments of the invention may be made without departing from the scope thereof, it is intended that all matter shown in the accompanying drawings or set forth in the accompanying specification shall be interpreted as illustrative and not in a limiting sense.

The invention described herein may be manufactured and used by or for the Government of the United States of America for governmental purposes without the payment of any royalties thereon or therefor.

What is claimed is:

1. A system of pulse radio communication comprising, means transmitting consecutively and within a predetermined interval of time for each element of a message a plurality of identical pulse groups each of which conveys the entire message element, means receiving said pulse groups, means connected to said receiving means for registering the pulses comprising said pulse groups, vacuum tube means connected to said receiving means striking from registration any previously received pulses in response to the initial pulse of the first received of said plurality of pulse groups, said registering means registering the remaining pulses in said first received pulse group, and multivibrator means connected to said vacuum tube means holding said vacuum tube means unresponsive to the initial pulses of subsequent pulse groups conveying the same message element, said registering means also registering all those pulses of each of said subsequent groups corresponding to pulses present as transmitted but not as received in previous pulse groups conveying the same message element.

2. A system of pulse radio communication comprising means transmitting consecutively and within a predetermined interval of time for each element of a message a plurality of identical pulse groups each of which conveys the entire message element, means receiving said pulse groups, means connected to said receiving means for registering the pulse comprising said pulse groups, means connected to said receiving means for striking from registration any previously received pulses in response to the initial pulse of the first received of said plurality of pulse groups, said registering means registering the remaining pulses in said first received pulse group, and means connected to said striking means holding same unresponsive to the initial pulses of subsequent pulse groups conveying the same message element, said registering means also registering all those pulses of each of said subsequent groups corresponding to pulses present as transmitted but not as received in previous pulse groups conveying the same message element.

3. A system of pulse communication comprising means transmitting consecutively and within a predetermined interval of time for each message element a plurality of pulse groups each of which conveys the entire message element, means for receiving said pulse groups, a plurality of devices coupled to said receiving means for registering in successive order the presence of pulses to be received in each group, means coupled between receiving means and said registering devices for removing from registration any previously received pulses, means coupled to said last-named means responsive to pulses from said receiving means to render said last named means inoperative to all but the initial pulse of the first group of pulses of each message element for a period substantially equal to said predetermined interval.

4. A system of pulse communication comprising, means transmitting consecutively and within a predetermined interval of time for each message element a plurality of pulse groups each of which conveys the entire message element, means for receiving said pulse groups, a plurality of devices coupled to said receiving means for registering in successive order the presence of pulses to be received in each group, each device to be responsive, if at all, to only a particular pulse in each of said groups, means coupled between receiving means and said registering devices for removing from registration any previously received pulses, means coupled to said last-named means responsive to pulses from said receiving means to render said last-named means inoperative to all but the initial pulse of the first group of pulses of each message element for a period substantially equal to said predetermined interval.

5. A system of radio communication comprising, transmitting means operable to consecutively transmit within a predetermined interval of time a plurality of identical pulse groups each of which conveys an entire message element, receiving means for receiving and registering the pulses comprising said pulse groups, means connected to said receiving means for striking from registration any previously received pulses in response to the initial pulse of the first received of said plurality of pulse groups, and a timing means connected to said last named means operable to hold said last named means non-responsive to the initial pulses of subsequent pulse groups received within said predetermined interval of time.

References Cited in the file of this patent

UNITED STATES PATENTS

| | | |
|---|---|---|
| 1,942,884 | Soullie | Jan. 9, 1934 |
| 2,023,446 | Schroeter | Dec. 10, 1935 |
| 2,272,070 | Reeves | Feb. 3, 1942 |
| 2,365,284 | McClelland | Dec. 19, 1944 |
| 2,388,733 | Fischler et al. | Nov. 13, 1945 |
| 2,404,814 | Reinhold et al. | July 30, 1946 |
| 2,430,038 | Wertz | Nov. 4, 1947 |
| 2,451,484 | Gould et al. | Oct. 19, 1948 |